United States Patent [19]

Nomura

[11] Patent Number: 4,893,668
[45] Date of Patent: Jan. 16, 1990

[54] CURTAIN WITH SUCKING DISKS

[75] Inventor: Chieko Nomura, Fukui, Japan

[73] Assignee: Home Lace Kyodokumiai (Home Lace Co-operative Union), Japan

[21] Appl. No.: 227,798

[22] Filed: Aug. 3, 1988

[30] Foreign Application Priority Data

Sep. 8, 1987 [JP] Japan ............................ 62-137328[U]

[51] Int. Cl.$^4$ ............................ E06B 3/80; A47H 3/00
[52] U.S. Cl. .................................. 160/327; 160/349.1;
160/354; 160/368.1; 160/370.2
[58] Field of Search ................... 160/330, 349.1, 349.2,
160/354, 327, 368.1, 370.2

[56] References Cited

U.S. PATENT DOCUMENTS

| 2,225,436 | 12/1940 | Lang | 160/349.1 |
|---|---|---|---|
| 2,642,577 | 6/1953 | Sherman | 160/330 X |
| 2,711,923 | 6/1955 | Parks | 160/370.2 X |
| 2,944,601 | 7/1960 | Compson | 160/370.2 |
| 3,338,293 | 8/1967 | Hohmann | 160/370.2 |
| 3,874,437 | 4/1975 | Black | 160/370.2 |
| 4,105,190 | 8/1978 | Curtis | 40/617 X |
| 4,293,862 | 10/1981 | Beavers | 156/94 X |
| 4,295,482 | 10/1981 | McMullen | 160/19 X |
| 4,346,875 | 8/1982 | Spencer et al. | 160/368.1 X |
| 4,428,412 | 1/1984 | Toro | 160/370.2 X |

FOREIGN PATENT DOCUMENTS 482035 of 1953 Italy ..................................... 160/330

*Primary Examiner*—Ramon S. Britts
*Assistant Examiner*—David G. Kolman
*Attorney, Agent, or Firm*—Larson and Taylor

[57] ABSTRACT

A curtain with sucking disks comprising a passage through which a rubber cord is passed and which is formed only at the upper side of the curtain or at the upper and lower sides thereof or at the right and left sides as well as at the upper and lower sides thereof, the rubber cord passed through each of these passages, and sucking disks attached to both end of each of the rubber cords.

2 Claims, 2 Drawing Sheets

CURTAIN WITH SUCKING DISKS

BACKGROUND OF THE INVENTION

Various kinds of curtains and suspenders for these curtains have been practically used, but they have been used with fixed rails. The curtain used at the rear window of car is suspended from a metal line stretched between fixing means on the rear window, but it is used only at this place and would have a limited size. Therefore, it can be called in a sense curtain used only at a fixed place.

SUMMARY OF THE INVENTION

The present invention relates to a curtain and more particularly, a curtain with sucking disks which is different from the conventional ones used only at a fixed place but capable of being used temporarily or at any times and places needed.

An object of the present invention is to provide a curtain with sucking disks capable of being used temporarily or at any times and places needed.

Another object of the present invention is to provide a curtain with sucking disks capable of being detachably attached directly to window glass, aluminum sash, wall and the like with more easiness A further object of the present invention is to provide a curtain with sucking disks capable of being used under the condition that the curtain is drawn to its fullest width or to its half or less width.

These and other objects of the present invention will become apparent from the following detailed description with reference to the accompanying drawings.

It should be understood that various changes and modifications which do not depart from the spirit of the present invention are covered by claims appended hereto.

DETAILED DESCRIPTION OF THE PREFERRED EMBODIMENTS

Figure 1:
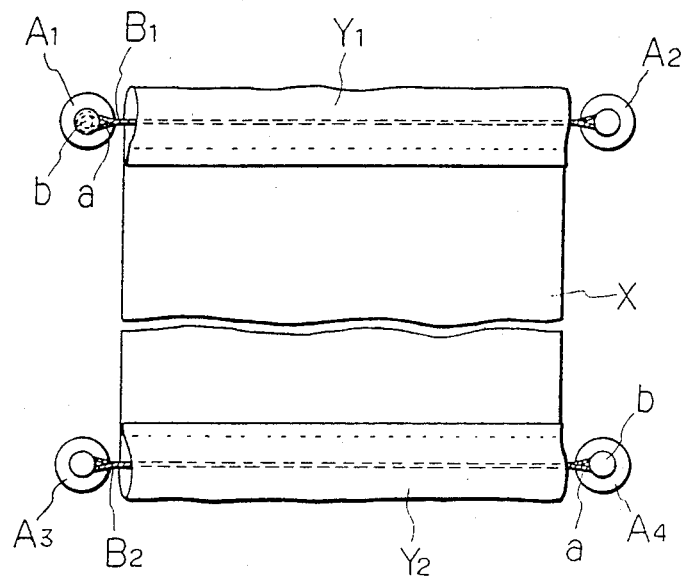
FIG. 1 is a front view showing an example of the curtain with sucking disks according to the present invention.

FIG. 1 shows a curtain with sucking disks according to the present invention wherein passages $Y_1$ and $Y_2$ are formed at the upper and lower sides of a curtain sheet X, rubber cords $B_1$ and $B_2$ are passed through these passages and sucking disks $A_1$, $A_2$, $A_3$ and $A_4$ are attached to both end loops (a) of these rubber cords.

Figure 2:
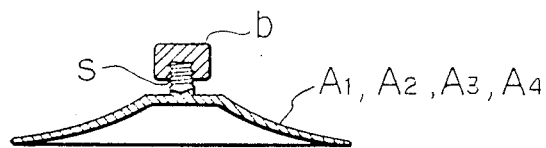
FIG. 2 shows the sucking disk vertically sectioned.

Each of the sucking disks $A_1$, $A_2$, $A_3$ and $A_4$ is provided with a threaded projection S on the front face and in the center thereof and a cap (b) screwed onto the threaded projection, as shown in FIG. 2.

The rubber cords $B_1$ and $B_2$ are quite elastic and when the curtain sheet is made by thin textile fabrics or lace, therefore, these rubber cords enable the curtain to be used under the state that its sheet is drawn to its fullest width or to its half or less width. The curtain with sucking disks of the present invention can be thus used at any places however wide or narrow these places may be.

When the rubber cord $B_2$ and sucking disks $A_3$, $A_4$ are removed from the curtain sheet X shown in FIG. 1, the curtain sheet X is made free at the lower side thereof, hanging only at the upper side thereof from the rubber cord $B_1$ to serve as a common curtain. When it is used like this, it needs no curtain rail but it can more easily serve as the detachable common curtain by attaching its sucking disks $A_1$ and $A_2$ onto window, aluminum sash, various walls and the like.

Figure 3:
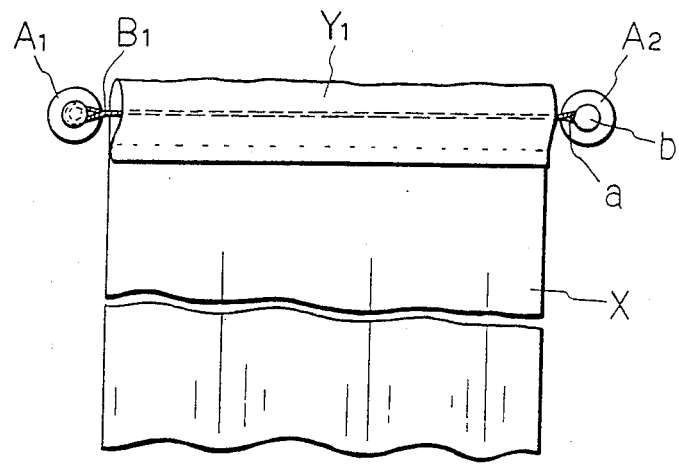
FIG. 3 is a front view showing another example of the curtain with sucking disks according to the present invention.

As shown in FIG. 3, no passage may be formed at the lower side of the curtain sheet X.

When the curtain sheet X has large width and heavy weight, an appropriate number of the sucking disks may be attached to the back side of the curtain sheet X by some appropriate means to suspend the whole of the curtain beautifully.

Figure 4:
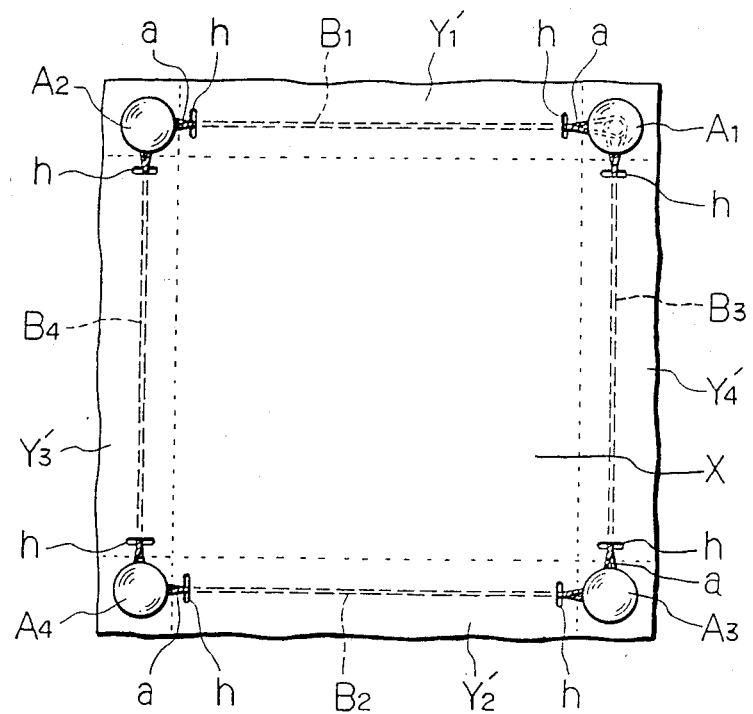
FIG. 4 is a back view showing a further example of the curtain with sucking disks according to the present invention.

FIG. 4 shows a further example of the curtain sheet X wherein rubber cords $B_1$, $B_2$, $B_3$ and $B_4$ are arranged at four sides of the curtain sheet X. More specifically, passages $Y'_1$, $Y'_2$, $Y'_3$ and $Y'_4$ are formed at the upper, lower, right and left sides of the curtain sheet X, slits (h) are provided on the back side and at both ends of each of the passages, the rubber cord is passed through each of the passages, entering into one of the slits (h) and coming out of the other one, and both end loops (a) are hooked on their respective sucking disks. When the rubber cord $B_2$ is removed and the sucking disks A and $A_4$ are detached from the object to which they are attached in the case of the curtain shown in FIG. 4, the curtain sheet X is pulled upward by the elasticity of the right and left rubber cords $B_3$ and $B_4$, so that the curtain can be quickly opened upward.

As described above, the curtain with sucking disks of the present invention can be used temporarily or at any times and places needed. In addition, it can be easily removed from one place and attached to another place. Further, it can also be used, spreading its curtain sheet X to its fullest width or half or less width, because the rubber cord is used. In other words, it can be used at any places however wide or narrow the matter to which the curtain is to be attached at these places may be. Furthermore, it needs no curtain rail but it can be detachably attached directly to window glass, aluminum sash, wall and the like by means of the sucking disks.

I claim:

1. A curtain apparatus comprising a curtain sheet, passages formed at upper and lower sides of the curtain sheet, rubber cords passed through respective said passages, and sucking disks attached to both ends of each of the rubber cords.

2. The curtain apparatus according to claim 1 wherein passages are also formed at right and left sides of the curtain sheet and said sucking disks are attached to both ends of each of the rubber cords passed through these right and left passages.

* * * * *